Dec. 9, 1952 C. O. MERCHANT 2,620,959
TRANSFERRING, SPACING, AND SELECTING DEVICE FOR ALIGNING WORKPIECES
Filed July 18, 1947 3 Sheets-Sheet 1

INVENTOR
Chester O. Merchant
BY
Florian S. Miller
ATTORNEY

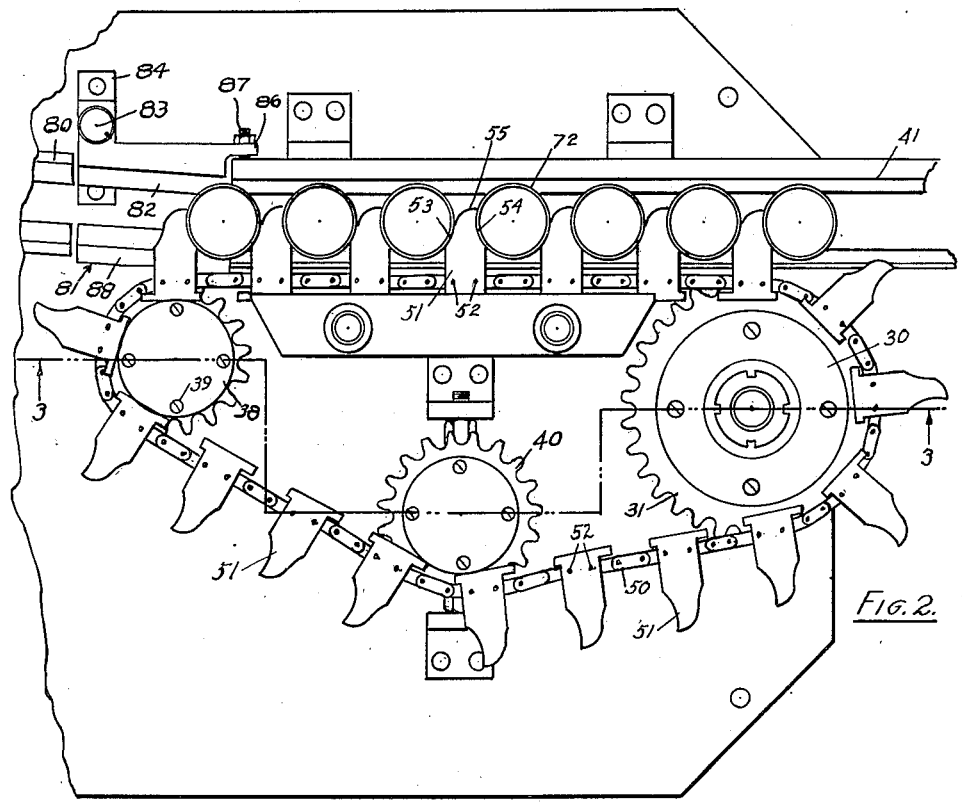
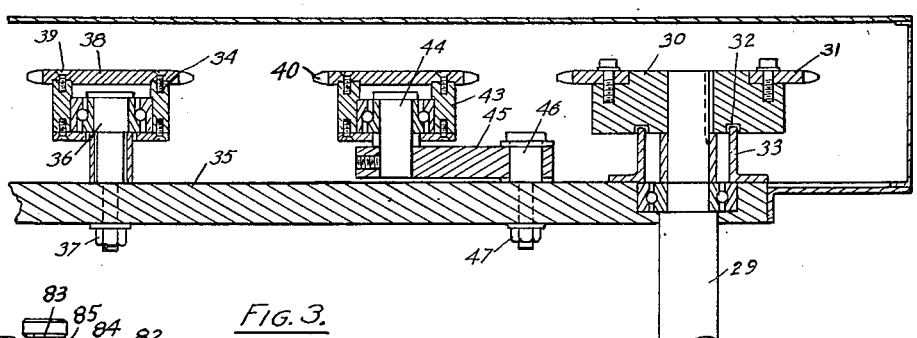
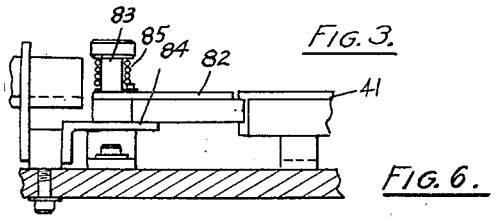

Dec. 9, 1952      C. O. MERCHANT      2,620,959
TRANSFERRING, SPACING, AND SELECTING DEVICE FOR ALIGNING WORKPIECES
Filed July 18, 1947      3 Sheets-Sheet 3
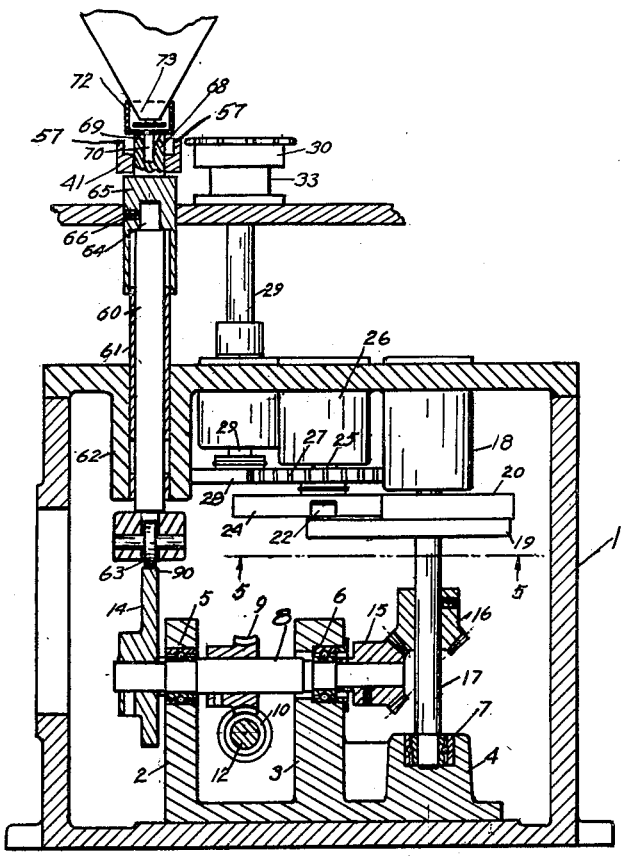
FIG. 4.
FIG. 5.
INVENTOR
Chester O. Merchant
BY
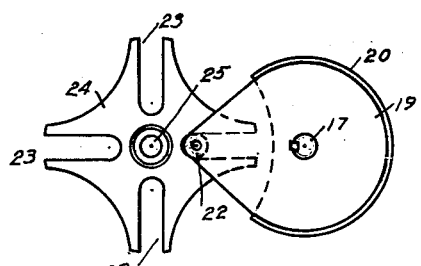
ATTORNEY Patented Dec. 9, 1952

2,620,959

UNITED STATES PATENT OFFICE 2,620,959

TRANSFERRING, SPACING, AND SELECTING DEVICE FOR ALIGNING WORKPIECES

Chester O. Merchant, Erie, Pa., assignor to Swanson Tool and Machine Products, Inc., Erie, Pa., a corporation of Pennsylvania Application July 18, 1947, Serial No. 761,785

6 Claims. (Cl. 226—95)

This invention relates generally to transferring and positioning devices for use in positioning work pieces on the work table of a machine and it relates more particularly to transferring and positioning devices for small work pieces on the work table of a machine combined with means for moving the work pieces into operative relationship at one or more work stations on a machine.

Devices of this character, made in accordance with the teachings of the prior art, and with which I am familiar have been closed, comparatively heavy devices, with the position of the work stations on a radius, wherein a considerable amount of congestion of the work pieces resulted, and difficulty in removing damaged work pieces from a device required considerable effort and loss of time. In these prior devices, the work pieces tilted very easily and positioning of the work pieces at particular work stations was inaccurate and caused considerable damage and trouble.

It is, accordingly, an object of my invention to overcome the above and other defects in transferring and positioning devices and it is more particularly an object of my invention to provide a transferring and positioning device for positioning work pieces at predetermined stations on the work table of a machine which is simple in constructon, economical in cost, economical in manufacture, and efficient in operation.

Another object of my invention is to provide a novel transferring and positioning device with straight line indexing.

Another object of my invention is to provide a transferring and positioning device with a minimum of vibration when indexed and which positions the work pieces in a straight line on a work table.

Another object of my invention is to provide a novel transferring and positioning device which permits a minimum of tilting of the work pieces.

Another object of my invention is to provide a novel transferring and positioning device which selects individual work pieces from a feed chute, which conveys said work pieces on a track intermittently to work stations on a filling or like machine in longitudinally spaced relationship, which intermittently moves said work pieces upwardly into engagement with filling nozzles, and which then moves the filled pieces onwardly in the track away from the work station.

Another object of my invention is to provide, in combination with a novel transferring and positioning device, adjustable means for automatically removing work pieces from a chute to the work table of a machine.

Another object of my invention is to provide a novel transferring and positioning device which is comparatively light in weight.

Another object of my invention is to provide a novel transferring and positioning device wherein the work stations are free and open and permit mechanisms and devices to be mounted on either side of the transferring and positioning members.

Another object of my invention is to provide a transferring and positioning device which provides straight line indexing and which eliminates congestion at the work stations.

Another object of my invention is to provide a novel transferring and positioning device which intermittently moves work pieces in a straight line on a work table and which moves the work pieces upwardly in a predetermined sequence.

Another object of my invention is to provide a novel transferring and positioning device which is extremely light in weight, which reduces power requirements, which minimizes wear on the driving parts due to the light load involved, and which permits high speed transferring and positioning of work pieces on a work table in predetermined sequences.

Another object of my invention is to provide a novel transferring and positioning device which holds work pieces in predetermined positions on a work table in a predetermined sequence with the necessary accuracy required for the operation to be performed.

Another object of my invention is to provide a novel transferring and positioning device which permits adjustment to transfer any work piece from one position where indexed to several positions where indexed in accordance with the number of operations to be simultaneously performed.

Another object of my invention is to provide a novel transferring and positioning device for transferring and positioning work pieces in sequence to work stations where desired operations thereon are to be performed.

Other objects of my invention will become evident from the following detailed description, taken in conjunction with the accompanying drawings, in which:

Fig. 2 is a top plan view of my novel transferring and positioning device;

Fig. 3 is a view taken on the line 3—3 of Fig. 2;

Fig. 4 is a transverse sectional view of the gear box of my novel transferring and positioning device;

Fig. 5 is a view taken on the line 5—5 of Fig. 4; and

Fig. 6 is a fragmentary side elevational view of a selective device to transfer work pieces from the transfer chute to the work table.

Figure 1:
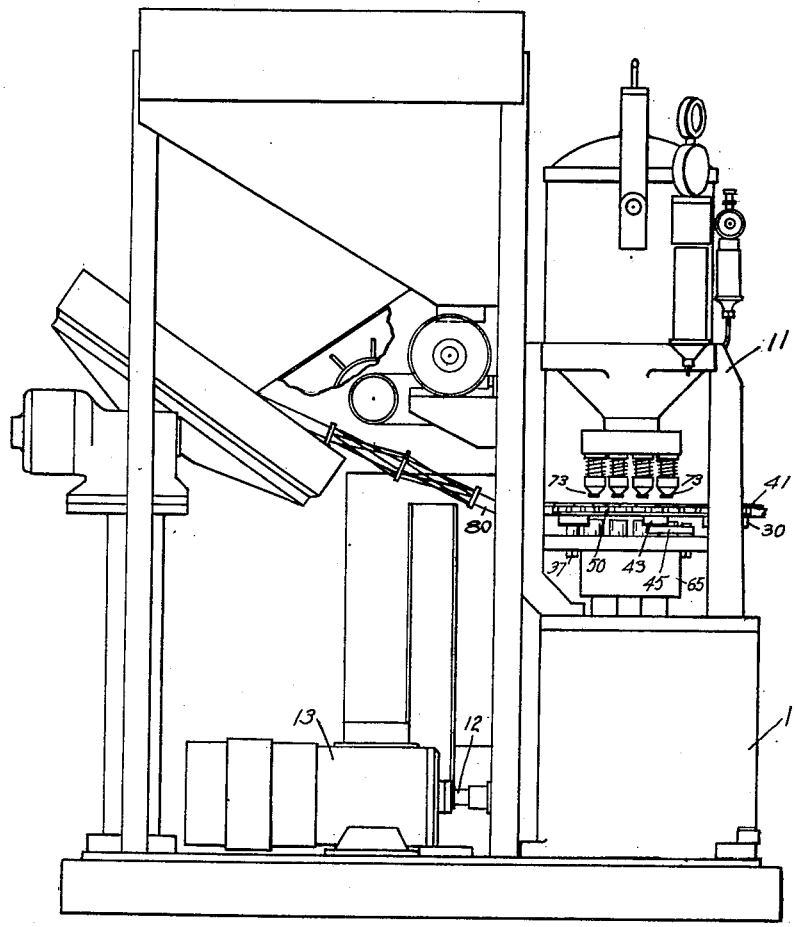
Fig. 1 is a side elevational view of an assembly showing my novel transferring and positioning device aligned with a transfer chute extending from a selecting hopper.

For purposes of illustration, I have shown in the drawings my novel transferring and positioning device adapted for use in positioning work pieces having stems, on the work table of a machine indexed for intermittent motion by utilizing an intermittent motion of the Geneva type. It will be understood that the movement of my novel positioning device may be continuous and many other types of indexing devices may be utilized without departing from my invention.

Referring now to the drawings, I have shown in Figs. 1 and 4 a gear box 1 forming the lower structural portion of a machine 11. The gear box 1 has bearing supports 2, 3 and 4 extending upwardly therein for supporting bearings 5, 6 and 7. The bearings 5 and 6 have journalled therein a transverse shaft 8 which has fixed thereon a worm wheel 9 in engagement with a worm 10 fixed on a driving shaft 12 which is driven by an electric motor 13. The shaft 8 has a cam member 14 fixably mounted at one end thereof. The bevel gear 15 engages a complementary bevel gear 16 fixed on a vertically extending shaft 17 which has the base thereof supported by bearing 7 in support 4. The upper end of shaft 17 is suitably journalled in depending member 18 and a disc 19 and a blocking disc 20 is fixably mounted as shown particularly in Fig. 5. This disc 19 has a roller 22 mounted thereon for engaging the slots 23 in cruciform disc member 24. The member 24 is fixed on shaft 25 which is rotatably journalled and held against vertical movement in the depending member 26. A gear 27 is fixedly mounted on the shaft 25 and engages a gear 28 mounted and fixed on shaft 29 for transferring rotative force and movement from the shaft 17 to the shaft 25 and to the shaft 29. The upper end of the shaft 29 is keyed to a sprocket member 30 with sprocket wheel 31 which has a grooved portion 32 engaging a flanged circular member 33 upon which it is supported and upon which it rotates. It will be evident that my roller 22 and cruciform member 24 form part of a conventional Geneva type motion in which the shaft 29 is rotated intermittently when the roller member 22 engages successively the slots 23 in the cruciform member 24. The blocking disc 20 is provided to prevent any unintentional movement of the cruciform member 24. An idler sprocket member 34 is spaced from the driving sprocket wheel 30 a predetermined distance and is supported on the support member 35 by support shaft 36 which is secured by a threaded nut 37. Sprocket wheel 38 is secured to the upper side of the sprocket member 34 by machine screw 39 to engage the sprocket chain 50. An open track 41 for work pieces is disposed on the work table of the machine 11 parallel to a tangent line passing through the outer periphery of the sprocket wheels 31 and 38. An adjustable sprocket member 43 with sprocket wheel 40 is supported on a vertical shaft 44 carried by an arm 45 which in turn is secured to the shaft 46 held by a threaded nut 47. The sprocket chain 50 engages the sprocket wheels 31, 38, and 40, a portion of the sprocket chain 50 moving parallel to the track 41 having a straight line movement. Flat transferring and positioning members 51 are disposed in spaced relationship on the sprocket chain 50 by connection to studs 52 on link plates of the chain 50. The members 51 are made to replace the conventional link plates in a chain. The outer portions of the positioning members 51 are movable over the track 41 and have opposed arcuate shaped portions 53 and 54 with an outer off-set portion 55 for engaging the work pieces 72 movable on the track 41 between the sides 57 thereof. The arcuate portions 53 and 54 are complementary to each other so that circular-shaped work pieces move along the track 41 held between arcuate-shaped portions 53 and 54 of the spaced positioning members 51 in accurate spaced predetermined positions.

After the work pieces reach a predetermined position on the rtack 41, shaft 60 movable in sleeve 61 which in turn is journalled in depending flange portion 62 in the gear box 1 is moved upwardly through engagement of a roller 63 on the lower end portion of the shaft 60 engaging the high point 90 on the cam 14 rotated by the shaft 8. The upper end of the shaft 60 has a reduced portion 64 for receiving an adapter member 65 which is locked and fastened to the reduced end 64 of the shaft 60 by locking screw 66. Adapter member 65 has four work piece engaging portions 68 having tapered countersunk apertures 69 for receiving the stems 70 of work pieces 72. Means (not shown) may be provided to detachably engage the stems 70 of the work pieces 72 such as spring-urged fastening means, in the apertures 69 of the engaging portions 68 of the adapter member 65. Adapter member 65 moves upwardly with the shaft 60 thereby forcing the work pieces 72 into engagement with the work stations 73 of the machine 11. It will be evident that my novel transferring and positioning device is automatic in operation and the spacing and positioning operation is performed intermittently while the operation of forcing the work pieces 72 into operative engagement with the work stations 73 is in sequence with the intermittent movement of the pieces 72 along the track 41. The positioning members 51 permit vertical movement of the pieces 72 while still positioning the pieces 72 in a horizontal plane. The adapter member 65 is preferably provided with an outwardly extending projecting portion or trip (not shown) for engaging any suitable pivoted operating lever to operate the machine 11 in any predetermined order or sequence when the shaft 60 moves upwardly.

A transfer chute 80 is off-set from the track 41 and is connected therewith by inclined chute 81 wherein the work pieces 72 pass to the track 41. The chute 81 has one side 82 thereof pivoted on shaft 83 on bracket 84. A torsional spring 85 is disposed around the shaft 83 and urges the projection 86 of the side 82 toward the side of the track 41. An adjusting screw 87 is provided in the projection 86 to permit adjustment of the side 82 thereby increasing or decreasing the angle between the side 82 and side 88 of chute 81. As the projection 86 approaches the chute 41, the greater will be the resistance to the passage of work pieces 72 through the chute 81.

It will thus be seen that the side 82 of the chute 81 is urged inwardly in the path of the work pieces 72 passing from the chute 80. A work piece 72 moves down and passes the inclined chute 81 when the offset end 55 of a positioning member 51 engages a work piece 72 as they pass around the sprocket wheel 38, thereby moving the projection 86 away from the track 41 and the opposite end of the side 82 of chute 81 out of the path of oncoming work pieces in chute 80.

It will be noted that the positioning and transferring members 51 have opposed, arcuate shaped portions 53 and 54 on the outer sides thereof which move in a straight line over the track 41 and engage the workpieces 72 to move them along the track 41 between the sides 57 thereof. The radii of the arcuate sides 53 and 54 are substantially the same as the radii of the workpieces which they engage. The arcuate shaped portions 53 and 54 on the comparatively flat transferring and positioning members 51 extend over the track 41 transversely thereof and they are disposed on opposite sides of a cylindrical workpiece 72 so as to position the workpieces 72 in exact longitudinally spaced positions on the track 41. In a filler machine for filling radio and like tube bases such as the machine shown for illustration in my drawings, it is necessary that the bases or workpieces be positioned in an exact position under the filler nozzles and make sealing contact therewith. This is true because of the pressure necessary for the filling. By having the arcuate portions 53 and 54 of the positioning members 51 in arcuate form, they move around the workpiece 72 when changing from a rotative to a straight line motion. My track 41 has an open slotted bottom to receive the stems on bases for radio tubes although it will be evident that any type of cylindrical member may be fed to an exact indexed position on the table of my machine. Furthermore, my indexing mechanism may be adjusted as heretofore described so that the members 51 may be fed along the track 41 and so that a workpiece may be transferred from one position on the track 41 to another or several positions thereon if several operations are to be simultaneously performed.

In operation, the shaft 8 is rotated through worm wheel 9, worm 10, and shaft 12 by the electric motor 13. Upon rotation of the shaft 8, the shaft 17 is rotated through bevel gears 15 and 16 thereby causing intermittent rotation of the shaft 29 through engagement of the roller member 22 on the disc 19 with the slots 23 in the cruciform disc 24. The present machine is so designed that the shaft 29 rotates the driving sprocket 31 sufficiently to permit four work pieces 72 to pass under the four work stations 73 of the machine 2. The high point 90 on the cam member 14 on the shaft 8 then moves upwardly causing the roller 63 on the shaft 60 and the adapter 65 thereon to move upwardly thereby forcing the work pieces 72 into operative position under the work stations 73 to perform the operation desired thereon. A conventional tripping device (not shown) is normally actuated at this point of the operation by an attachment to the shaft 60 to operate the machine 11. The roller 63 then moves downwardly from the high point 90 of the cam 14 causing the shaft 60 to move downwardly with the adapter 65 on the upper end thereof after which the roller 22 of the Geneva type motion engages the next succeeding slot 23 in the cruciform member 24 to move the completed work pieces outwardly along the track 41 and to move four new pieces to be worked on under the work stations 73 to repeat the operations heretofore described. The pivoted side 82 of chute 81 is urged inwardly by spring 85 to prevent movement of the work pieces 72 into the chute 41 on the work table of machine 11. As the outer ends 55 of the positioning members 51 engage the work pieces 72, the pivoted side 82 of chute 81 is moved outwardly a sufficient amount to permit a work piece 72 from chute 80 to pass thereinto, after which the spring 85 causes the side 82 of chute 81 to move back into the path of the oncoming work pieces 72 in the chute 80. By adjustment of the screw 87, the resistance to the passage of work pieces 72 to the chute 81 may be varied. It will thus be seen that a work piece is always in position to be engaged by the outer end 55 of a positioning member 51. Many changes in the methods of indexing and in the adapters may be made in my novel transferring and positioning device without departing from my invention. The whole operation may be made continuous if desired. Suitable indexing may be provided so that different operations may be performed on a work piece in successive operations on a work table of a machine.

From the foregoing it will be evident that I have provided a novel transferring and positioning device which acurately positions work pieces at the work stations of a machine where work is to be performed thereon, which is light in weight, which has a minimum of vibration, which is conducible to high speed operation, which engages the work pieces in such a manner as to prevent tilting of the pieces, which reduces power requirements, which practically eliminates wear, which permits straight line indexing thereby preventing any congestion of the pieces on the work table, which is free and open and permits mechanisms and devices to be mounted on either side of the positioning devices, which provides novel means for moving the work pieces in working relationship with the work stations of the machine and which provides novel means for holding back aligned work pieces ready for movement to the work table of the machine.

Various changes may be made in the specific embodiment of my invention without departing from the spirit thereof or from the scope of the appended claims.

What I claim is:

1. A combined work transferring, positioning and raising device for cylindrical work pieces comprising a track with upwardly extending parallel sides spaced substantially the distance of the diameter of a workpiece to be guided therein, a plurality of spaced, straight lined, moving, comparatively flat conveying and positioning members movable over said track adapted to hold and position cylindrical work pieces in said track therebetween, the outer sides of said flat conveying and positioning members transversely to the movement thereof having opposed, arcuate shaped portions of substantially the same radius of curvature as the workpiece to be positioned whereby said opposed arcuate shaped portions define arcs of a circle of substantially the same diameter as said workpieces and whereby the conveying and positioning member on the back side of each workpiece passing through said track is movable around said workpiece when it changes from a rotative to a straight lined movement, means for moving said positioning members intermittently to position a predetermined number of said work pieces to spaced work stations of a machine, and cam-operated means for raising said work pieces at the work stations of a machine, said cam-operated means being operated by the same means providing the intermittent motion to said positioning members.

2. A work transferring, positioning and raising device for moving stemmed cylindrical socket members into vertical alignment and into engagement with filling members on a filling machine comprising a track having upwardly extending parallel sides and an open, longitudinally slotted bottom for conveying said socket members, the stems of said workpieces extending downwardly in said slotted portion of said track, horizontally disposed sprockets, a chain movable about said sprockets, a portion of said chain being movable in a straight line parallel to said track, comparatively flat positioning and transferring members secured to said chain and movable over the top of said track having arcuate sides for holding said socket members therebetween, said arcuate sides being of substantially the same radius of curvature as said workpieces to be transferred and positioned whereby said workpieces are held in said track between the opposed arcuate shaped portions on adjacent transferring and positioning members, an intermittent motion device of the Geneva type for intermittently driving said sprockets and positioning said work pieces beneath said filling members, a power shaft, transmission members between said power shaft and said intermittent motion device, a cam on said power shaft, a vertically movable follower shaft engaged with and movable by said cam member intermittently, and an adapter on the end of said shaft having spaced apertures for seating the stems of said workpieces, the upper portion of said adapter being movable through the open slotted bottom of said track, and to move them vertically into engagement with said filling members after they have been positioned by the movement of said intermittent motion device.

3. A work transferring and positioning device for cylindrical workpieces comprising a track having parallel, upwardly extending sides mounted on the work table of a machine, progressively movable, longitudinally spaced, comparatively flat conveying and positioning members movable in a straight line above and along said track longitudinally thereof having opposed, arcuate shaped portions transverse to the line of movement of said flat conveying and positioning members of substantially the same radius of curvature as the workpiece to be moved whereby said workpiece fits between the opposed arcuate shaped portions of two adjacent conveying and positioning members, the arcuate shaped portion on the forward side of said members being movable around a cylindrical workpiece upon engagement therewith while it is moving from rotative movement to straight line movement, a chain for carrying said work conveying and positioning members, means for driving said chain intermittently, and means for moving said workpieces upwardly in said track following the intermittent motion of said conveying and positioning members.

4. A work transferring and positioning device as set forth in claim 3 wherein said means for moving said work pieces upwardly comprises a cam operated vertically extending shaft having an adapter on the upper end thereof for engaging the bottom of said work pieces, the means for moving said shaft being the same means as that used for moving said positioning members intermittently.

5. A work transferring and positioning device for stemmed cylindrical workpieces comprising a track having parallel, upwardly extending sides and the bottom thereof longitudinally slotted for receiving and guiding the stems of said workpieces, horizontally disposed sprockets, a chain movable about said sprockets, a portion of said chain being movable in a straight line parallel to said track, comparatively flat positioning and transferring members carried by said chain in spaced relationship movable over the top of said track, each of said flat positioning and transferring members having arcuate shaped portions on opposite sides of the outer ends thereof of substantially the same radius of curvature as the cylindrical workpiece to be transferred and positioned, the arcuate shaped portion on the rear of one of said flat positioning and transferring members cooperating with the arcuate shaped portion on the front of the opposing positioning and transferring member to define arcs of a circle of subsatntially the same radius of curvature as the workpiece, means for intermittently rotating said sprockets, and means for moving said workpieces in said track upwardly after they have been moved a predetermined distance by the intermittent movement of said sprockets.

6. A work transferring and positioning device for cylindrical workpieces as set forth in claim 5 wherein the ends of said work transferring and positioning members are tapered and they are so spaced that individual workpieces are selected for engagement with said transferring and positioning members on said chain.

CHESTER O. MERCHANT.

REFERENCES CITED

The following references are of record in the file of this patent:

UNITED STATES PATENTS

| Number | Name | Date |
|---|---|---|
| 1,053,632 | Mulholland | Feb. 18, 1913 |
| 1,171,339 | Hoskins et al. | Feb. 8, 1916 |
| 1,828,232 | Rowe | Oct. 20, 1931 |
| 1,924,146 | Almgren | Aug. 29, 1933 |
| 1,954,278 | Adams | Apr. 10, 1934 |
| 2,142,257 | Saeta | Jan. 3, 1939 |
| 2,405,232 | Nordquist | Aug. 6, 1946 |
| 2,432,449 | Scoville et al. | Dec. 9, 1947 |